(12) United States Patent
Bäcklund et al.

(10) Patent No.: US 11,270,236 B2
(45) Date of Patent: Mar. 8, 2022

(54) METHOD FOR GENERATING A SECURITY ROUTE

(71) Applicant: Irisity AB, Gothenburg (SE)

(72) Inventors: Marcus Bäcklund, Lidingö (SE); Victor Hagelbäck, Nödinge (SE)

(73) Assignee: Irisity AB, Gothenburg (SE)

( * ) Notice: Subject to any disclaimer, the term of this patent is extended or adjusted under 35 U.S.C. 154(b) by 0 days.

(21) Appl. No.: 16/625,852

(22) PCT Filed: Jun. 19, 2018

(86) PCT No.: PCT/SE2018/050653
§ 371 (c)(1),
(2) Date: Dec. 23, 2019

(87) PCT Pub. No.: WO2019/009781
PCT Pub. Date: Jan. 10, 2019

(65) Prior Publication Data
US 2020/0134538 A1  Apr. 30, 2020

(30) Foreign Application Priority Data
Jul. 5, 2017 (SE) .................................. 1750886-2

(51) Int. Cl.
*G06Q 10/06* (2012.01)
(52) U.S. Cl.
CPC ............. *G06Q 10/063112* (2013.01); *G06Q 10/06316* (2013.01); *G06Q 10/06398* (2013.01)
(58) Field of Classification Search
None
See application file for complete search history.

(56) References Cited

U.S. PATENT DOCUMENTS

| | | | |
|---|---|---|---|
| 8,104,672 B2* | 1/2012 | Mitchell, Jr. ......... | G08B 25/14 235/375 |
| 9,672,520 B1* | 6/2017 | Brandmaier ......... | G06Q 10/06 |
| 10,233,021 B1* | 3/2019 | Brady ................. | G05D 1/0282 |
| 2005/0094772 A1 | 5/2005 | Harrison et al. | |
| 2013/0073336 A1* | 3/2013 | Heath .................... | G06Q 30/02 705/7.29 |
| 2013/0332216 A1 | 12/2013 | George et al. | |
| 2014/0172482 A1* | 6/2014 | Mitchell ......... | G06Q 10/06311 705/7.15 |
| 2014/0278661 A1 | 9/2014 | Nielsen et al. | |

(Continued)

FOREIGN PATENT DOCUMENTS

WO  2004053750 A1  6/2004

OTHER PUBLICATIONS

Calavia, Lorena, et al. "A semantic autonomous video surveillance system for dense camera networks in smart cities." Sensors 12.8 (2012): 10407-10429. (Year: 2012).*

(Continued)

*Primary Examiner* — Thomas L Mansfield
(74) *Attorney, Agent, or Firm* — RMCK Law Group, PLC

(57) ABSTRACT

The present disclosure relates to a computer implemented method for generating a security route to be operated by a user, specifically created based on security tasks generated by a security system. The present disclosure also relates to a corresponding security system and a computer program product.

13 Claims, 2 Drawing Sheets

(56) References Cited

U.S. PATENT DOCUMENTS

2018/0357073 A1* 12/2018 Johnson ............ H04M 1/72403

OTHER PUBLICATIONS

International Search Report and Written Opinion for International Application No. PCT/SE2018/050653 dated Nov. 14, 2018, 14 pages.
Pillac, V., et al., "On The Dynamic Technician Routing and Scheduling Problem," Oct. 9, 2012—https://hal/archives-ouvertes.fr/hal-00739781, 18 pages.
Extended European Search Report dated Mar. 16, 2021 for EP Application No. 18828346.9, 9 pages.

* cited by examiner

METHOD FOR GENERATING A SECURITY ROUTE

CROSS-REFERENCE TO RELATED APPLICATIONS

This application is a 371 U.S. National Stage of International Application No. PCT/SE2018/050653, filed Jun. 19, 2018, which claims priority to Swedish Patent Application No. 1750886-2, filed Jul. 5, 2017. The disclosures of each of the above applications are incorporated herein by reference in their entirety.

TECHNICAL FIELD

The present disclosure relates to a computer implemented method for generating a security route to be operated by a user, specifically created based on security tasks generated by a security system. The present disclosure also relates to a corresponding security system and a computer program product.

BACKGROUND

With an increasing interest in the positive effects following the application and use of a security system, such as a reduced risk of sabotage and/or break-in, the security market is greatly expanding. To ensure that an end user of a security system is receiving an adequate level of security service for the security system, such as short access time to e.g. highly skilled security personnel, it is necessary to have such security personnel readily available once an event takes place at a security site where the security system is installed.

However, the cost of engaging a large highly skilled staff for handling such events must be balanced with the end users willingness to pay for the delivered service. In balancing the two, a planning scheme will thus have to target cost versus the risk of not fulfilling e.g. a promised service level.

With this in mind, it would be desirable to allow for the engagement of low-cost personnel, possibly having a local connection to the security site, to perform at least a portion of the tasks normally performed by the highly skilled security personnel. Planning of which tasks and how/when the tasks are to be performed by the low-cost personnel is a complicated task not easily achieved while at the same time ensuring cost-effectiveness and an adequate quality of service delivered by the low-cost personnel.

SUMMARY

According to an aspect of the present disclosure, the above is at least partly met by a computer implemented method performed by a security system for generating a security route, wherein the security system comprises a first mobile computing device having a graphical user interface (GUI) adapted to be handled by a user, and a server connected to the first mobile computing device over a network, wherein the method comprises the steps of receiving, at the server, a plurality of security tasks, each of the security tasks to be performed at a specific geographical location, receiving, at the server, a current geographical location for the first mobile computing device, selecting, at the server, a set of the plurality of security tasks by correlating the specific geographical locations for the plurality of security tasks and the current geographical location for the first mobile computing device, forming, at the server, a security route based on the selected set of the plurality of security tasks, presenting the security route to the user at the GUI of the first mobile computing device, and receiving contextual data from the user, through the GUI, when the user is travelling along the security route.

By means of the present disclosure, the server comprised with the security system may typically be arranged in electronic communication with a plurality of security sites, where the plurality of security sites are provided with means for monitoring the security sites. The means for monitoring the security sites may for example include security cameras, where video streams generated by the security cameras are summoned to a human operator for deciding if any abnormalities exist. The monitoring means may alternatively or also comprise e.g. motion detectors (e.g. PIR), magnetic contacts, passage control arrangements, etc. Examples of security sites include homes, offices, construction sites, schools, common grounds and properties, etc.

The server will as a consequence receive information relating to any changes taking place at the security sites. Additionally, e.g. the proprietor of a security site may inform the server of a desire to include some form "non-electronic" form of security service provided in relation to the security site, for example including human monitoring of the security site or a device at the security site (such as e.g. to ensure that an autonomous lawnmower is functioning properly while the proprietor is away from the security site).

In conclusion, the server holds information in relation to a plurality of security tasks to be performed at a security site, where the security task is generated by e.g. a monitoring means or a proprietor initiated request for service. In line with the above discussion, the security task is related to a geographical location, such at or in a vicinity of the security site.

In accordance to the present disclosure, the (first) user is provided with a (first) mobile computing device, such as a mobile phone, a tablet, a laptop, etc. The mobile computing device may typically be provided with some form of geolocation means, such as a GPS receiver, adapted to generate some form of geolocation data relating to a current geographical location of the mobile computing device. Information relating to the geographical location of the mobile computing device is received at the server, from the mobile computing device using a network connection such as the Internet. Other means are possible for collecting information in relation to a location to the mobile computing device and are equally possible and in line with the present disclosure.

The server in turn correlates the current geographical location of the mobile computing device with the information relating to the different tasks to be performed at e.g. the different security sites (arranged at different geographical locations). Based on the correlation, the server selects a set of the security task considered to suitably align to the current geographical location of the mobile computing device operated by the user. In a possible embodiment of the present disclosure, the GUI provided with the mobile computing device may be adapted to allow the user to form a geographical area surrounding the current geographical location of the mobile computing device. In such an embodiment, the set of security task may be selected within the user defined geographical area.

Based on the selected set of security tasks, the server forms a security route to be operated by the user. The GUI may be configured to allow the user to provide information relating to a means of transportation, i.e. how the user is intended to operate the security route. The formation of the security route may further be based on the means of transportation. The security route may for example be presented within a map to be displayed within the GUI of the mobile computing device. The security map may further comprise information relating to tasks assigned to the user and to be performed along the security route. The tasks may in one embodiment be connected to timing for when to perform the tasks. Compensation provided to the user in completing the task may in one embodiment be dependent on how fast/on time the user is completing the task.

In accordance to the present disclosure, the mobile computing device or the GUI is preferably adapted to allow the user to input information when travelling/operating the security route. The information to be provided by the user when operating the security route includes contextual information relating to e.g. the security sites or in relation to the completion of the assigned tasks. In a possible embodiment of the present disclosure the mobile computing device is adapted to capture some form of media, such as an image, video or audio captured when the user is operating the security route. The GUI may also be adapted to allow the user to provide written information in relation to e.g. the task, the security site or in relation to other findings in relation to the security route. The written information may in one embodiment be formed by presenting e.g. multiple-choice questions to the user and/or to provide questions to the user in a "decision tree" manner. In an embodiment the user may be allowed to input contextual data comprises incident information relating to one of the set of security tasks.

An advantage following the concept as provided by the present disclosure is that a security route automatically may be generated and provided to any user assigned/connected to the security system, for example including possibly low cost and/or unskilled staff. Accordingly, user may be allowed to in an "ad-hoc" manner connect (sign up) to the security system and be allowed to perform assigned tasks along the security route. The security system may thus be operated in a dynamic manner, where the availability of security tasks may generate a drive for users to connect to the security system for earning a profit when performing the tasks. The profit for performing tasks may be fluctuating and to be dependent on the availability of users and tasks. Thus, in case there is a low number of tasks and a high number of users (within a defined area), and then the profit for performing a task may be in comparison low. Correspondingly, in case there is a high number of tasks and a low number of users then the profit for performing a task may be in comparison high. The system may thus in accordance to the present disclosure be adapted to determine a profit per task by correlating the number of available tasks and the number of available users.

In an embodiment of the present disclosure the method further comprises the step of assigning a skill level to the user, wherein selecting the set of the plurality of security tasks is further based on the skill level for the user. Accordingly, not all tasks may be allowed to be completed by all users. For example, a novice user may not necessarily be allowed to perform all available tasks, but the set of tasks may be "filtered" to only comprise task that corresponds to the skill level of the novice user. In addition, some tasks may be considered "to easy" for an expert user and the set of tasks may be filtered to not comprise the task considered to be too easy for the expert user.

Possibly, the server may receive information relating to a further security task, such as in case of the monitoring means generating information about an abnormality at a security site, at a location e.g. corresponding to the geographical area selected by the user. In such a case, the security route may be updated and presented to the user through the GUI. Accordingly, a dynamic behavior may advantageously be implemented through the security system provided in line with the present disclosure, allowing the security route to be changed in case of e.g. tasks having an in comparison high priority needs the attention of the user, as compared to tasks that may be performed at a later time. In case additional sites/tasks are added to the security route the user may be compensated, e.g. by receiving an additional payment. In pressing situations it may also be possible to encourage the user to quickly move to the security site/perform the task and thereby receive an extra compensation. The GUI is preferably adapted to allow the user to accept or not accept the updated security route.

In accordance to the present disclosure it is possible to allow the server to form a security report based on the contextual information provided by the user. That is, the information provided to by the server may for example be used for creating a report to be provided to e.g. the proprietor of the security site or a representative thereof. The contextual information/report may also be distributed, if allowed, to e.g. the police or security personnel engaged to handle e.g. an aftermath following e.g. an intrusion at the security site.

In a possible embodiment of the present disclosure the GUI may be further adapted for allowing the user to input informational data relating to geographical locations along the security route. Such informational data may for example comprise information relating to possible future security tasks, where the server may be adapted to form promotional data based on the informational data form the user. Accordingly, in case the user identifies possible tasks that "could" be performed by him or another user connected to the security system, such possible tasks may be used for forming information be provided to e.g. a proprietor of a "not yet connected" security site that may gain from being connected to the security system according to the present disclosure and thus may receive the services provided in line with the present disclosure.

It should be understood that any form of informational data may be collected by the user for forming a further understanding of e.g. a security site and the surroundings of the security site. The informational data may not necessarily be used for forming promotional data, but the server may autonomously form further tasks to be performed by the user based on the informational data. The GUI may further be adapted based on the skill level of the user for allowing different types of informational data to be generated based on the skill level of the user.

Possibly, the method according to the present disclosure may also comprise the steps of receiving, at the server, a user performance based on received contextual data, and adjusting the skill level for the user based on a result of the determination of the user performance. Accordingly, in case tasks completed by the user are considered to be performed in a "high quality manner", the user may e.g. be promoted, thereby considered to have an increased skill level. In such a case and in line with the above discussion, the tasks assigned to the user may be somewhat changed to "better" match the skill level of the user.

In a possible embodiment of the present disclosure it may be possible to allow the server to allow at least one of the tasks to be a "training tasks" generated by the server and thus not necessarily related to an actual task relating to e.g. a security site. The user may accordingly be trained based on such training tasks, and the skill level may be adapted based on how well the user is completing the training tasks.

In accordance to the present disclosure it may also be possible to allow a specific task to be completed to form part of a first security route for the first user and a second security route for a second user, the second user provided with a second mobile computing device. Distribution of "the same task" to more than a single user may have different reasons, where a first reason may be related to allow for peer-review by e.g. the second user of how well the first user completed the task. The GUI for the second user may be adapted accordingly. A second reason for distribution the same task to more than a single user may be in situations where the task (or the area where the task is to be performed) to be considered somewhat "dangerous" or otherwise complicated. Thus, it may be desirable to allow the first and the second user to work together for completing the task.

According to another aspect of the present disclosure there is provided a security system adapted for generating a security route, wherein the security system comprises a first mobile computing device having a graphical user interface (GUI) adapted to be handled by a user, and a server connected to the first mobile computing device over a network, wherein security system is configured to receive, at the server, a plurality of security tasks, each of the security tasks to be performed at a specific geographical location, determine, at the server, a current geographical location for the first mobile computing device, select, at the server, a set of the plurality of security tasks by correlating the specific geographical locations for the plurality of security tasks and the current geographical location for the first mobile computing device, form, at the server, a security route based on the selected set of the plurality of security tasks, present the security route to the user at the GUI of the first mobile computing device, and receive contextual data from the user, through the GUI, when the user is travelling along the security route. This aspect of the present disclosure provides similar advantages as discussed above in relation to the previous aspect of the present disclosure.

According to a still further aspect of the present disclosure there is provided a computer program product comprising a non-transitory computer readable medium having stored thereon computer program means for operating a security system adapted for generating a security route, wherein the security system comprises a first mobile computing device having a graphical user interface (GUI) adapted to be handled by a user, and a server connected to the first mobile computing device over a network, wherein the computer program product comprises code for receiving, at the server, a plurality of security tasks, each of the security tasks to be performed at a specific geographical location, code for receiving, at the server, a current geographical location for the first mobile computing device, code for selecting, at the server, a set of the plurality of security tasks by correlating the specific geographical locations for the plurality of security tasks and the current geographical location for the first mobile computing device, code for forming, at the server, a security route based on the selected set of the plurality of security tasks, code for presenting the security route to the user at the GUI of the first mobile computing device, and code for receiving contextual data from the user, through the GUI, when the user is travelling along the security route. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
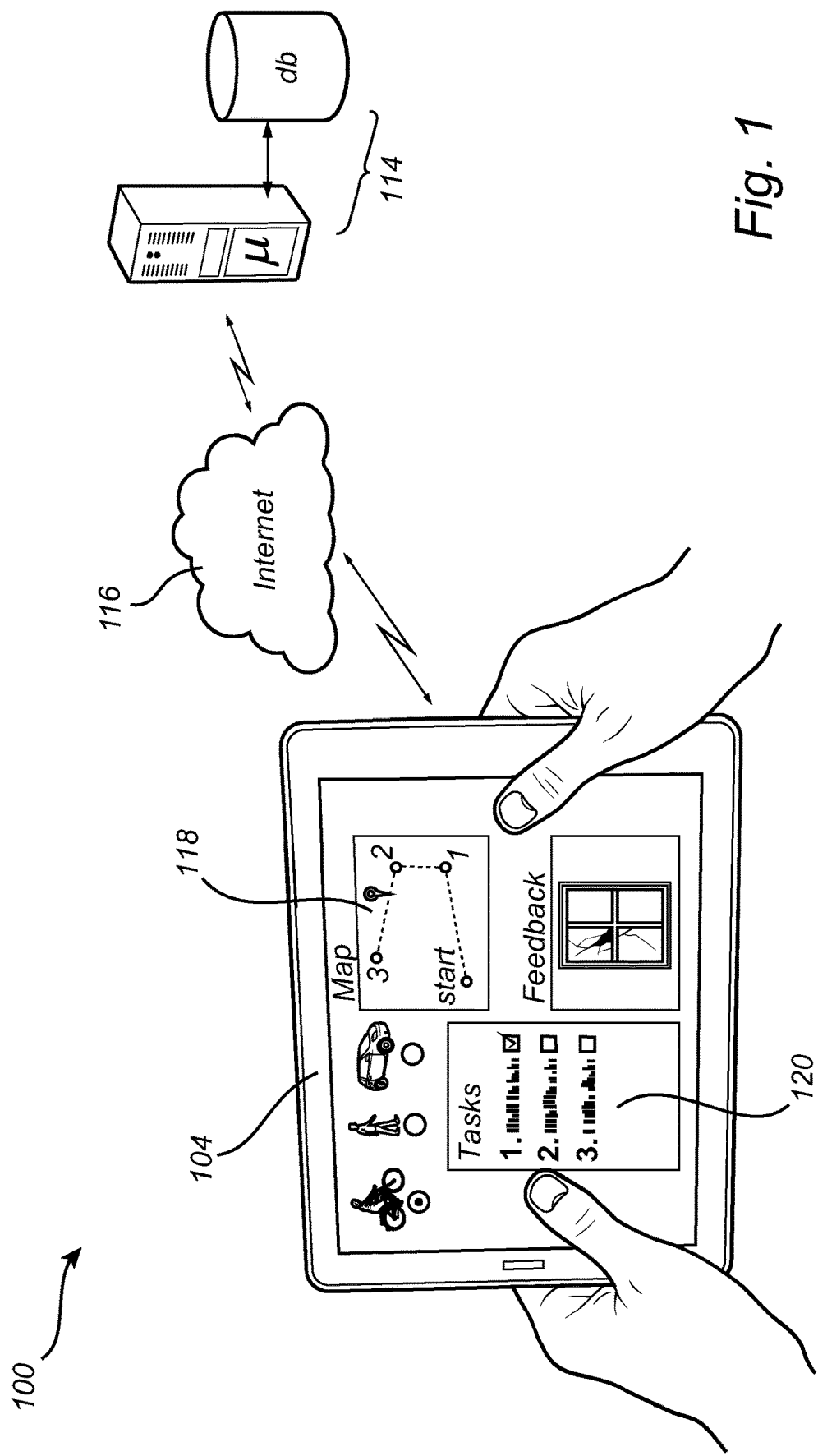
FIG. 1 illustrates a security system according to a currently preferred embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout.

Referring now to the drawings and to FIG. 1 in particular, there is depicted a security system 100 according to a possible embodiment of the present disclosure. The security system 100 comprises a first mobile computing 102 having a graphical user interface (GUI) 104 adapted to be handled by a first user 106, and a server/database 114 connected to the first mobile computing device 102 over a network 116, such as the Internet. The first mobile computing device 102 may for example be a laptop computer, a mobile phone, a tablet, etc. The security system 100 may typically comprise a large plurality of mobile computing devices operated by a corresponding plurality of users.

The network 116 may be in part be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar.

The server 114 may in one embodiment be a cloud-based server. Thus, the computing power provided by means of the present disclosure may be distributed between a plurality of servers, and the location of the servers must not be explicitly defined. Advantageous following the use of a cloud-based solution is also the inherent redundancy achieved.

As illustrated in FIG. 1, the GUI 104 of the first user mobile computing 102 is provided in a detailed illustration and exemplified to comprise features for allowing the first user 106 to interact with the server 114 when performing security tasks assigned to the first user 106. Specifically, in the exemplifying illustration provided in FIG. 1 the user 106 is allowed to input information relating to his mode of transportation, where in the illustration the user 106 has selected that his mode of transportation is by bike.

The GUI 104 is further adapted to present a security route 118 to the user 106, for example being overlaid within a map. The illustration shown in FIG. 1 indicates that the user 106 has left his start position, passed a first and a second security site and is now on his way to the third security site. It should be understood that the security route not necessarily must provide a direct route between the different security sites, rather the route may be formed such that the tasks are performed based on an e.g. an urgency or priority level for the different security sites and the thereto related tasks.

The GUI 104 further holds information relating to the tasks 120 that has been assigned to the user 106. The GUI 104 may for example be provided with a check-box for allowing the user to indicate what task 120 (and possibly when) has been completed.

The GUI further comprises means for allowing the user 106 to input contextual data for further provision to the server 114. The GUI 104 may for example acquire media, such as an image, a video sequence, an audio sequence, from the mobile computing device 102. In the illustration provided in FIG. 1 the GUI 104 is shown to comprise a frame/tab adapted for allowing the user to e.g. input an image of a security site where a task has been completed. Specifically, in FIG. 1 the image is shown as a photo of a broken window at a security site visited by the user 106. That is, the user 106 may for example have been assigned a security task to visit a security site where the security system 100 has received information relating to an abnormality (e.g. from monitoring means arranged at the security site). Once the user 106 has reached the security site for completing the security task the user 106, the user notices that the window is broken and takes a photo of the broken window for future use in informing e.g. the proprietor of the security site or for use by the police/insurance company in relation to an aftermath of the broken window.

Figure 2:
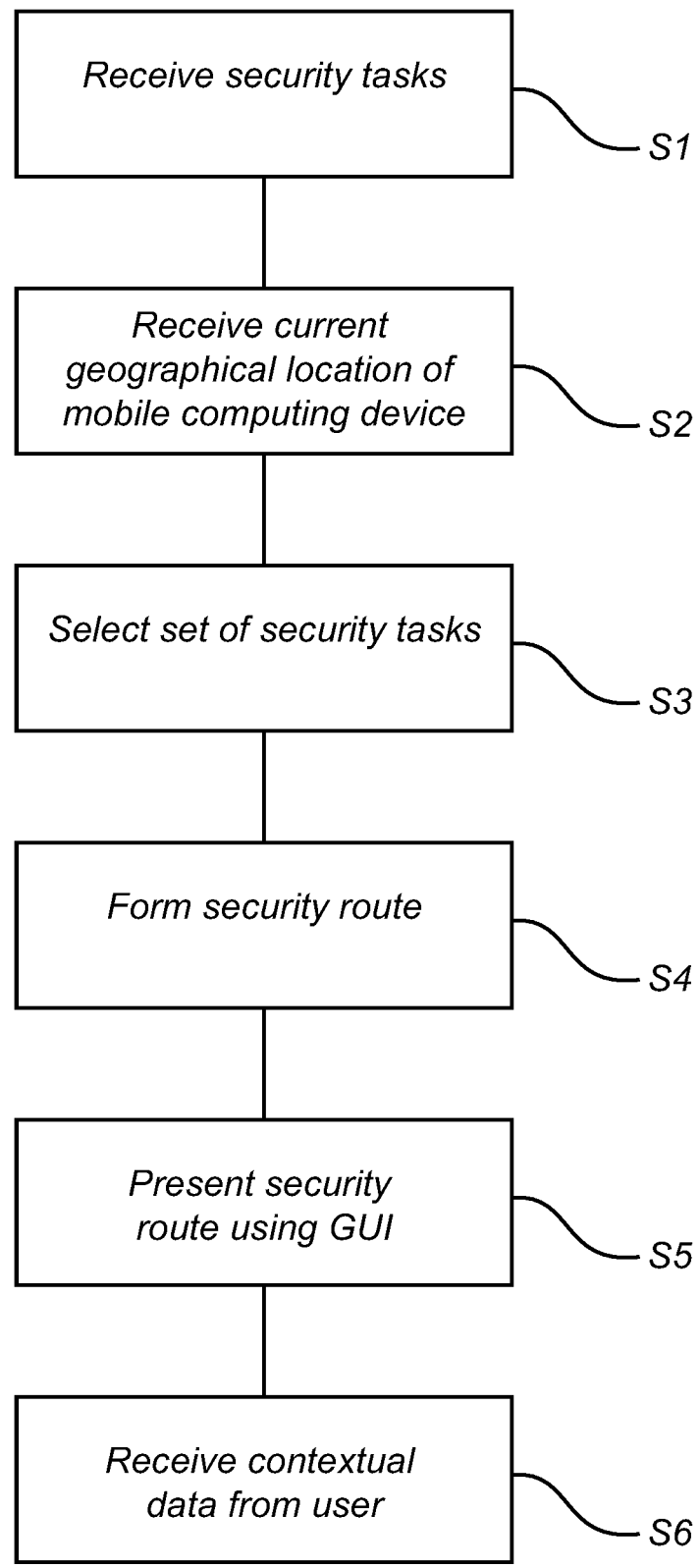
FIG. 2 shows a flow chart of a method according to an embodiment of the present disclosure.

In summary and with further reference to FIG. 2, the present disclosure relates to a computer implemented method performed by a security system 100 for generating a security route 118, wherein the security system 100 comprises a first mobile computing device 102 having a graphical user interface 104 (GUI) adapted to be handled by a user 106, and a server 114 connected to the first mobile computing device 102 over a network 116, wherein the method comprises the steps of receiving, at the server 114, a plurality of security tasks, each of the security tasks to be performed at a specific geographical location, receiving, at the server 114, a current geographical location for the first mobile computing device 102, selecting, at the server 114, a set 120 of the plurality of security tasks by correlating the specific geographical locations for the plurality of security tasks and the current geographical location for the first mobile computing device 102, forming, at the server 114, a security route 118 based on the selected set 120 of the plurality of security tasks, presenting the security route 118 to the user 106 at the GUI 104 of the first mobile computing device 102, and receiving contextual data from the user, through the GUI 104, when the user 106 is travelling along the security route 118.

By means of the present disclosure, it is possible to automatically form security routes and provide tasks to users assigned/connected to the security system. Accordingly, user may be allowed to in an "ad-hoc" manner connect (sign up) to the security system and be allowed to perform assigned tasks along the security route. The security system may thus be operated in a dynamic manner, where the availability of security tasks may generate a drive for users to connect to the security system for earning a profit when performing the tasks.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method performed by a security system for generating a security route, wherein the security system comprises:
 a first mobile computing device having a graphical user interface (GUI) that is displayed to a user, and
 a server connected to the first mobile computing device over a network,
 wherein the method comprises:
  receiving, at the server, a plurality of security tasks, each of the security tasks being associated with a specific geographical location, wherein receiving the plurality of security tasks comprises receiving, at the server, a signal from a monitoring sensor located at the specific geographical location, wherein the monitoring sensor comprises at least one of a security camera, a motion detector, a passive infrared sensor, one or more magnetic contacts, or one or more passage control arrangements,
  receiving, at the server, a current geographical location for the first mobile computing device,
  selecting, at the server, a set of the plurality of security tasks by correlating the specific geographical locations for the plurality of security tasks and the current geographical location for the first mobile computing device, wherein selecting the set of the plurality of security tasks comprises determining when a geographical location of a security task is within a predetermined radius from the current geographical location of the first mobile computing device, wherein the predetermined radius is provided by the user through the GUI of the first mobile computing device,
  automatically forming, at the server, the security route based on the selected set of the plurality of security tasks,
  presenting the security route to the user at the GUI of the first mobile computing device, including information relating to the selected set of the plurality of security tasks, and
  receiving contextual data from the user, through the GUI, when the user is travelling along the security route, wherein the contextual information relates to security sites or to a completion of the selected set of the plurality of security tasks.

2. The method according to claim 1, further comprising: assigning a skill level to the user, wherein selecting the set of the plurality of security tasks is further based on the skill level for the user.

3. The method according to claim 1, further comprising: receiving, at the server, a further security tasks,
 dynamically updating the security route when a geographical location for the further security tasks is correlated with the current geographical location for the first mobile computing device, and
 presenting the updated security route to the user at the GUI of the first mobile computing.

4. The method according to claim 1, wherein the contextual data comprises incident information relating to one of the set of security tasks.

5. The method according to claim 1, wherein the contextual data comprises media captured at the specific geographical location one of the set of security tasks.

6. The method according to claim 4, further comprising: forming, at the server or at the first mobile computing device, a security report based on the contextual information provided by the user.

7. The method according to claim 1, wherein inputs informational data relating to geographical locations along the security route via the GUI.

8. The method according to claim 7, wherein the informational data comprises information relating to future security tasks.

9. The method according to claim 7, further comprising: forming, at the server, promotional data based on the informational data form the user.

10. The method according to claim 2, further comprising: receiving, at the server, a user performance based on received contextual data, and
 adjusting the skill level for the user based on a result of the determination of the user performance.

11. A security system for generating a security route, wherein the security system comprises:
 a first mobile computing device having a graphical user interface (GUI) that is displayed to a user, and
 a server connected to the first mobile computing device over a network,
 wherein security system is configured to:
  receive, at the server, a plurality of security tasks, each of the security tasks being associated with a specific geographical location, wherein receiving the plurality of security tasks comprises receiving, at the server, a signal from a monitoring sensor located at the specific geographical location, wherein the monitoring sensor comprises at least one of a security camera, a motion detector, a passive infrared sensor, one or more magnetic contacts, or one or more passage control arrangements,
  determine, at the server, a current geographical location for the first mobile computing device,
  select, at the server, a set of the plurality of security tasks by correlating the specific geographical locations for the plurality of security tasks and the current geographical location for the first mobile computing device, wherein selecting the set of the plurality of security tasks comprises determining when a geographical location of a security task is within a predetermined radius from the current geographical location of the first mobile computing device, wherein the predetermined radius is provided by the user through the GUI of the first mobile computing device,
  automatically form, at the server, the security route based on the selected set of the plurality of security tasks,
  present the security route to the user at the GUI of the first mobile computing device, including information relating to the selected set of the plurality of security tasks, and
  receive contextual data from the user, through the GUI, when the user is travelling along the security route, wherein the contextual information relates to security sites or to a completion of the selected set of the plurality of security tasks.

12. A computer program product comprising a non-transitory computer readable medium having stored thereon computer program means for operating a security system for generating a security route, wherein the security system comprises:
 a first mobile computing device having a graphical user interface (GUI) that is displayed to a user, and a server connected to the first mobile computing device over a network, wherein the computer program product comprises:

code for receiving, at the server, a plurality of security tasks, each of the security tasks being associated with a specific geographical location, wherein receiving the plurality of security tasks comprises receiving, at the server, a signal from a monitoring sensor located at the specific geographical location, wherein the monitoring sensor comprises at least one of a security camera, a motion detector, a passive infrared sensor, one or more magnetic contacts, or one or more passage control arrangements, code for receiving, at the server, a current geographical location for the first mobile computing device, code for selecting, at the server, a set of the plurality of security tasks by correlating the specific geographical locations for the plurality of security tasks and the current geographical location for the first mobile computing device, wherein selecting the set of the plurality of security tasks comprises determining when a geographical location of a security task is within a predetermined radius from the current geographical location of the first mobile computing device, wherein the predetermined radius is provided by the user through the GUI of the first mobile computing device, code for automatically forming, at the server, the security route based on the selected set of the plurality of security tasks, code for presenting the security route to the user at the GUI of the first mobile computing device, including information relating to the selected set of the plurality of security tasks, and code for receiving contextual data from the user, through the GUI, when the user is travelling along the security route, wherein the contextual information relates to security sites or to a completion of the selected set of the plurality of security tasks.

13. The method according to claim 1, wherein the contextual data comprises media captured at the specific geographical location of the set of security tasks and relates to one of the sets of security tasks, and the method further comprises:

forming, at the server or at the first mobile computing device, a security report based on the content of the contextual data, the report indicative of an intrusion at a security site where the security tasks are handled by the user.

* * * * *